(12) United States Patent
Moeller (10) Patent No.: US 8,483,512 B2
(45) Date of Patent: Jul. 9, 2013

(54) POSITION DETERMINATION METHOD FOR A GEODETIC MEASURING DEVICE

(75) Inventor: Bernd Moeller, Luechingen (CH)

(73) Assignee: Leica Geosystems AG, Heerbrugg (CH)

( * ) Notice: Subject to any disclaimer, the term of this patent is extended or adjusted under 35 U.S.C. 154(b) by 732 days.

(21) Appl. No.: 12/598,458

(22) PCT Filed: May 8, 2008

(86) PCT No.: PCT/EP2008/003698
§ 371 (c)(1),
(2), (4) Date: Nov. 2, 2009

(87) PCT Pub. No.: WO2008/138541
PCT Pub. Date: Nov. 20, 2008

(65) Prior Publication Data
US 2010/0119161 A1 May 13, 2010
US 2010/0232714 A2 Sep. 16, 2010

(30) Foreign Application Priority Data

May 10, 2007 (EP) ..................................... 07107973

(51) Int. Cl.
*G06K 9/36* (2006.01)
*G06K 9/00* (2006.01)
*G01B 11/275* (2006.01)
*G01C 9/00* (2006.01)

(52) U.S. Cl.
USPC ........... 382/291; 382/106; 382/107; 382/109; 33/228; 702/150

(58) Field of Classification Search
USPC ...... 382/291, 216, 106–109; 33/228; 702/150
See application file for complete search history.

(56) References Cited

U.S. PATENT DOCUMENTS

| | | | |
|---|---|---|---|
| 6,078,285 A * | 6/2000 | Ito | 342/357.64 |
| 6,762,600 B2 * | 7/2004 | Khalfin | 324/207.17 |
| 6,986,294 B2 * | 1/2006 | Fromme et al. | 73/865.8 |
| 7,590,264 B2 * | 9/2009 | Mattes et al. | 382/107 |
| 8,244,053 B2 * | 8/2012 | Steinberg et al. | 382/255 |
| 8,422,032 B2 * | 4/2013 | Buehlmann et al. | 356/614 |
| 2004/0093119 A1 * | 5/2004 | Gunnarsson et al. | 700/245 |
| 2005/0057647 A1 * | 3/2005 | Nowak | 348/116 |

(Continued)

FOREIGN PATENT DOCUMENTS
DE 4300566 A1 7/1993

*Primary Examiner* — Michelle Entezari
(74) *Attorney, Agent, or Firm* — Maschoff Brennan (57) ABSTRACT

The invention relates to a position determination method for a geodetic device having a distance and angle measuring functionality, such as a total station (1), a determination being made of the relative location of the geodetic device and reference points (2) marked with reflectors ($P_1$-$P_n$) of a quantity of reference points, by measuring the distance ($D_1$-$D_n$) and at least one angle ($\phi_i$-$\phi_n$, $\theta_1$-$\theta_n$) from the geodetic device to the reference points as reference variables, the reference variables being determined in a device-based reference system. For the reference point quantity formed by the reference points ($P_1$-$P_n$) and a reference point quantity of measurable reference points (A-G), the positions of which are known in an external reference system, common elements are identified, the relative location of the reference points ($P_1$-$P_n$) being derived from the reference variables and the common elements being identified and associated based on the relative location of the reference points ($P_1$-$P_n$). The position (S) of the geodetic device in the external reference system is determined from the common elements and the positions thereof in an external reference system.

19 Claims, 5 Drawing Sheets

U.S. PATENT DOCUMENTS

| | | |
|---|---|---|
| 2005/0057745 A1* | 3/2005 | Bontje ................... 356/139.03 |
| 2005/0102063 A1 | 5/2005 | Bierre |
| 2006/0119833 A1* | 6/2006 | Hinderling et al. .......... 356/5.11 |
| 2006/0251307 A1* | 11/2006 | Florin et al. ................. 382/128 |
| 2006/0290693 A1* | 12/2006 | Zhou et al. ................... 345/420 |
| 2007/0033170 A1* | 2/2007 | Sull et al. ........................ 707/3 |
| 2007/0052951 A1 | 3/2007 | Van Cranenbroeck |
| 2007/0064246 A1* | 3/2007 | Braunecker et al. ......... 356/614 |
| 2007/0146363 A1* | 6/2007 | Shen ............................. 345/420 |
| 2008/0036758 A1* | 2/2008 | Carpenter et al. ............ 345/419 |

* cited by examiner

POSITION DETERMINATION METHOD FOR A GEODETIC MEASURING DEVICE

BACKGROUND

The invention relates to a position determination method for a geodetic device.

A multiplicity of methods of measurement has been known since antiquity for recording properties of defined points in a measuring environment, in particular of data having a spatial reference. Standard spatial data recorded are the location of a measuring device in addition to any reference points present, and direction, distance and angle to measuring points. While the position of the geodetic measuring device is known in many applications and measurements are made to unknown positions, there are, however, also applications in which some measuring points are known or are surveyed but the location of the measuring device is unknown.

A generally known example of such surveying devices or geodetic devices is the theodolite or a total station. An overview of geodetic measuring apparatuses of the prior art is provided by "Elektronische Entfernungs—und Richtungsmessung [Electronic Distance and Direction Measuring]" by R. Joeckel and M. Stober, $4^{th}$ Edition, Verlag Konrad Wittwer, Stuttgart 1999. Such devices have angle and distance measuring functions which permit a direction and distance determination to a selected target. The angle and distance quantities are determined in the internal reference system of the device and optionally must also be linked to an external reference system for an absolute position determination.

In principle, the actual position, i.e. the station coordinates of the measuring device, can be derived as so-called free stationing from measurements to known, fixed measuring points. Free stationing is understood as meaning the determination of the coordinates of a new point from measurements which were made from this new point to surrounding measured, i.e. known measuring points. Such measurements are direction and distance measurements.

First, the position of the surrounding points relative to the station is calculated in a local coordinate system. With the aid of the known coordinates of the surrounding points, adjusted transformation parameters are calculated, if more than the necessary number of measurements are present, from which parameters the coordinates of the new point which are sought then follow. This process can be illustrated by an example: distances and directions are measured to a few surrounding points and the position of these points relative to the location, i.e. in a local coordinate system, is plotted on a transparency. A map of the desired coordinate system is now placed under this transparency. This system may be the national coordinate system or the coordinate system of a specific construction project. The measuring points must now also be found on this map. The transparency is rotated and shifted until the transparency points coincide as well as possible with the points drawn on the map, which can be effected algorithmically by fit calculations by the least squares method. The coordinates of the new point can now be read on the map. This principle is not applied graphically but analytically, it always being necessary to know and to assign the point number of a measuring point and the measured values from the geodetic device to this measuring point.

The calculations required for this purpose are integrated as software in most modern total stations or tacheometers. However, this still means that point numbers and coordinates of the measuring points to which measurements are made must be input in a linked manner; the coordinates of the location and other desired results, such as variances, etc, are then automatically calculated from the measurements and can be stored or output. The minimum number of measurements which are required for such calculation comprise the determination of distance and direction to at least two measuring points. In practice, however, measurements over and above these are, if possible, carried out in order to obtain data on the reliability of the results by overdetermination.

Algorithms with which the location coordinates are calculated from measurements of direction and distance to more than two fixed points may be, for example, similarity transformations associated with a mediating fit, which is also referred to as Helmert transformation in the technical literature.

The erection of a total station and the determination of the actual station coordinates on the basis of known measuring points are generally tailored to the trained surveying engineer with regard to user guidance. The user must reliably identify in the field the measuring points used for calculating the station coordinates and must assign to said measuring points the correct point numbers which establish the link to the position of the measuring point. This is possible as a rule only with a plan in which ground and measuring points are entered. A corresponding manual assignment of actual measurement to measuring point is therefore time-consuming and associated with errors.

Moreover, specific applications, such as, for example, the use of total stations in machine control applications, mean that it is also not necessary for specially trained surveying specialists to operate the devices. Device configurations and user guidance to date are, however, not tailored to this user group.

Position determination methods of the prior art are therefore based on the surveying of known measuring points whose measured values together with the point numbers or the position data of the measuring points are recorded or further processed. This necessary assignment of the measured values to points in the measurement delays the method, increases the susceptibility to errors and complicates the automatability.

SUMMARY

An object of the present invention is therefore to provide an improved and simplified position determination method for a geodetic device.

A further object of the present invention is to reduce the susceptibility to errors and the time requirement for a position determination.

A further object of the present invention is to permit an automated position determination.

The position determination method according to the invention departs from the necessary linkage of point number or point identification and recording of the measured data which must be complied with in the measurement. The procedure of free stationing is simplified to such an extent that the measuring points sighted no longer need be identified via the point number, so that finally a measurement to the known measuring points can take place in a fully automatic manner.

Moreover, the method according to the invention is based on the surveying of known measuring points. For this purpose, a geodetic measuring device, such as, for example, a total station, is positioned at a point to be determined. Thereafter, measuring points visible from this position are surveyed automatically or manually, distance and one or two angles being measured. For example, a scan with a definable vertical opening angle is carried out over a full circle by a total station, in which scan prisms mounted at the measuring points are automatically detected and surveyed. Horizontal direction, vertical angle and distance are measured to all prisms found. The case of the measurement of only one angle may in certain circumstances be sufficient on levelled surfaces, such as, for example, on air fields. By means of the measured values, the position of measuring points is established in the actual reference system of the measuring device. The relative position of the measuring points to one another as well as to the measuring device is known.

In order to permit a linkage with the external reference system and hence absolute positioning, at least some of the measured values must be assigned as reference points to the known measuring points as datum points.

By means of this assignment effected after or even successively during the process of measured value recording, the linkage which occurs in methods of the prior art during each individual measurement, i.e. after identification and with the knowledge of the measuring or datum point to which measurement is made specifically, is produced.

According to the invention, two distributions or patterns of points are produced. Firstly, surveying and recording of a reference point by surveying in an internal reference system, i.e. with reference to the surveying device, are effected. Secondly, a distribution or a pattern of points is given as datum points with known position in an external reference system. Thus, two distributions or patterns in different reference systems exist. These reference systems are correlated by the identification of common points, i.e. those which exist in both distributions. This means that the two reference systems are related to one another, the arrangement of the points relative to one another, i.e. their relative position, being used for this purpose. Such a derivation of the relative position of the reference points to one another uses allows the correlation of the two distributions, so that an identification of the common points of the two distributions and their relative position to one another are possible. The position of the reference points relative to one another can be represented here mathematically in various ways. Firstly, the position of the reference points can be described on the basis of their direct relative reference quantities, for example by angles and distances of the reference points to the respective other reference points, a linkage of these reference points related to one another with the position of the geodetic measuring device preserving the relationship with the object of the position determination. Secondly, however, the relative position to one another can also be represented indirectly or indirectly as a distribution in the internal reference system of the geodetic measuring device, all or some of the reference quantities being related to the position relative to the measuring device. The position at the reference points relative to one another is therefore defined via the common reference quantity of the position of the geodetic measuring device. Of course, it is also possible to use combinations of these representations, for example both the original measured quantities from geodetic measuring device to the reference points and their relative reference quantities derived therefrom, together or in selected combinations, are used for representing the distribution in the internal reference system.

The assignment of reference points to datum points, i.e. the identification of the surveyed point, can be effected before position determination or simultaneously therewith. Various approaches are available for the assignment, such as, for example, from image processing, optimisation or graph theory.

For example, a pattern which is compared by image processing means to a pattern derived from the measuring points can be derived from the relative position of the points in the local reference system of the measuring device. For example, pattern matching approaches in which a search algorithm determines whether and where the given pattern of the measured reference points recurs in the search area defined by the measuring points are suitable for this purpose. In a similar manner, it is also possible to use shape-based matching in which edges are sought. Thus, it is not point patterns that are compared with one another but connecting lines thereof as edges. Such methods may have advantages in terms of the long-term behaviour.

While the image processing also considers the position of the points relative to one another and in their totality, it is also possible to use methods with reduced information, in which only the horizontal distances between all measured points are calculated and are compared directly with the horizontal distances between the points stored in a measuring point directory. As a result, it is possible to identify the sighted points as long as they are randomly distributed on the ground, i.e. do not all have the same distance from one another.

Graphical optimisation methods produce a certain connection in which, for example, all possible connections between the points according to direction and distance are plotted as a graph. This arrangement of nodes and edges can then be compared with a representation of the measured points which is produced in the same or a similar manner. Such approaches likewise offer the possibility of data reduction, for example by producing a minimum framework or minimum spanning tree for the graph of the reference point, which framework or spanning tree is subsequently fitted into the graph of the datum points, i.e. of the measuring points. In the case of agreement, the corresponding points are assigned. Here, the method can also be effected in a plurality of stages, for example by first fitting the minimum spanning tree and verifying its correct position by successive addition of further edges. One variant thereof would also be the integration of the longest edge of the graph of the reference points into the graph of the datum points. Subsequently, the next longest edges are included until the required number of points has been assigned. However, this approach requires a sufficient spread in the distribution of the edge lengths.

Since the position of the measuring device relative to the reference points is also known and the latter are correlated with the datum points after assignment is complete, the position of the measuring device can also be derived directly. Alternatively, this assignment step can, however, also form only the starting point for conventional methods.

Owing to the relatively large number of points and the approaches used, errors may also be concomitantly processed if corresponding thresholds are suitably set or a certain number of unsuitable points is accepted. Such errors may arise if existing measuring points are incorrectly entered in the measuring point directory or are incorrectly positioned. Another source of errors comprises measurements to reflective surfaces which are incorrectly interpreted as measurements to reflectors and are further processed. For example, a position determination method according to the invention can be set up in such a way that, with a very good agreement of forty reference points and datum points, it interprets the lack of agreement of three or four points as an error and does not take account of these points any further. Such a threshold may also be derived taking into account the distribution of measuring or datum points.

BRIEF DESCRIPTION OF THE DRAWINGS

A position determination method according to the invention is described in more detail below, purely by way of example, with reference to working examples shown schematically in the drawing. Specifically.

DETAILED DESCRIPTION

Figure 1:
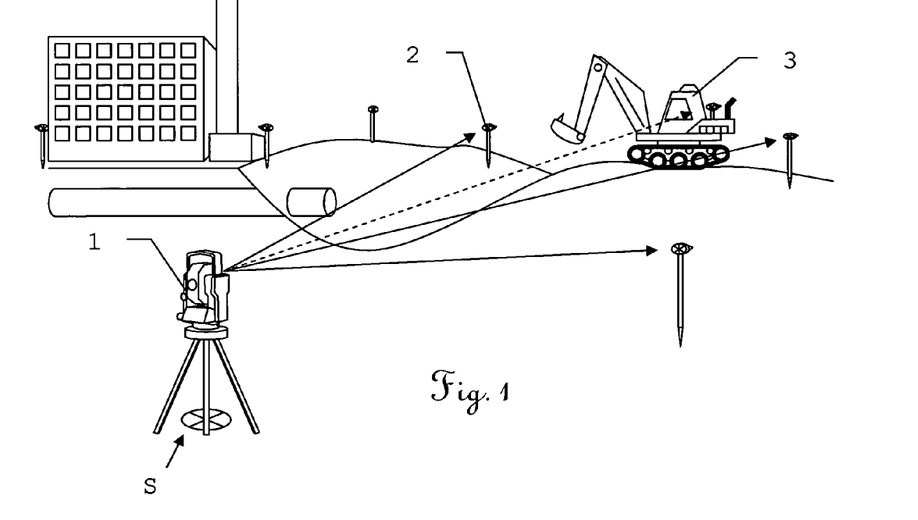
FIG. 1 shows the schematic diagram of a typical surveying situation in the construction sector.

FIG. 1 schematically illustrates a typical surveying situation in the construction sector as an example of the position determination of a geodetic device. Here, a total station 1 is set up as a geodetic device having distance and angle measuring functionality at a stationing point S which simultaneously defines the device-related, internal reference system. If an unknown stationing point S is chosen, the total station can also determine its own position absolutely by reference measurements to reflectors 2 which are set up at known, measured datum points. For this purpose, the point number for each reflector 2 and the measured values in the reference system are recorded for each reflector 2. After the surveying of a sufficient number of reflectors 2 or datum points, the station point S can also be determined in the external reference system on the basis of the relative position of total station 2 and reflectors 2 and the absolute positions of the reflectors 2 assigned via the point numbers in a datum point directory, and hence the total station 1 can be positioned absolutely.

After the positioning process, measurements to further targets whose position is to be determined can then be carried out by the total station 1. In this example, the position of a construction machine 3 can subsequently be determined and continuously monitored or tracked.

Figure 2:
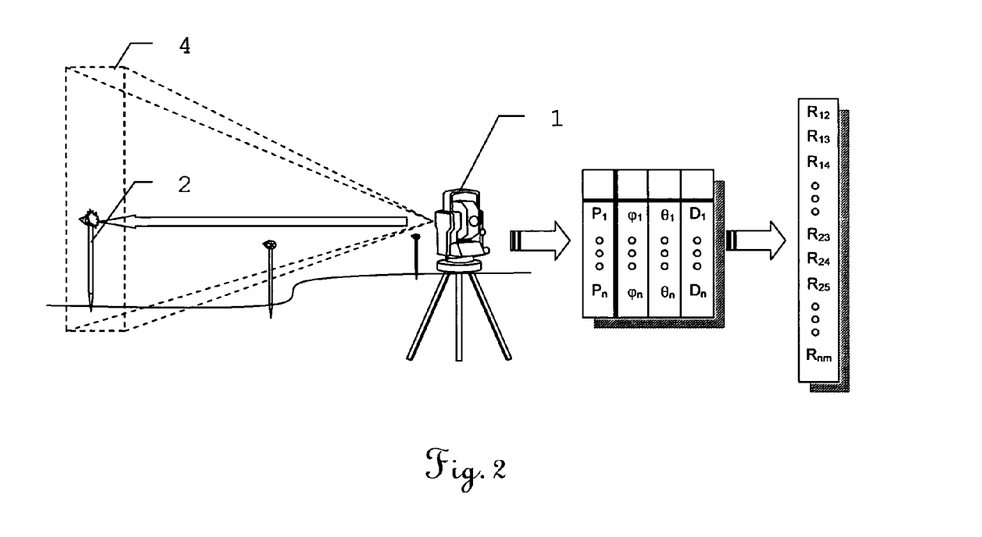
FIG. 2 shows the schematic diagram for the recording of measured quantities.

The recording of the measured quantities linked to the measurements is illustrated in FIG. 2. In this example, the surveying process is effected automatically by virtue of the fact that the total station 1 emits a laser beam having a fan shape. Said laser beam covers a horizontal region with a vertically opened cross-section 4, e.g. 360°, in which all reflectors 2 present are identified on the basis of their reflectivity and automatically surveyed. Here, the reflectors 2 to which measurements are made are continuously indexed with a reference point number $P_i$ where i=1 ... n, for which in each case a horizontal angle and vertical angle $\phi_i$ and $\theta_i$, respectively, and the distance $D_i$ to the measuring device are determined and stored. The measured values are thus determined in the internal reference system of the device and assigned there to the continuously surveyed points. From the measured values $\phi_i$, $\theta_i$ and $D_i$ determined, the distances or radii $R_{ij}$ of the reference points $P_1$ to $P_n$ relative to one another, i.e. their relative distance to one another, can then also be derived.

Usually, the numbers of datum points and of reference points are not identical. The reasons are, for example, that not all datum points present can be detected and surveyed from the station point S or that reflections which have a different origin, for example due to reflections by reflective glass surfaces on buildings or driver's cabs of construction machines, are erroneously identified as reflectors and are surveyed. As shown by way of example in FIG. 3, three reference points $P_1$ to $P_3$ are surveyed manually or automatically in this example, so that their relative positions in the reference system of the device which are indicated by arrows, i.e. relative to the stationing point S, are known.

Figure 3:
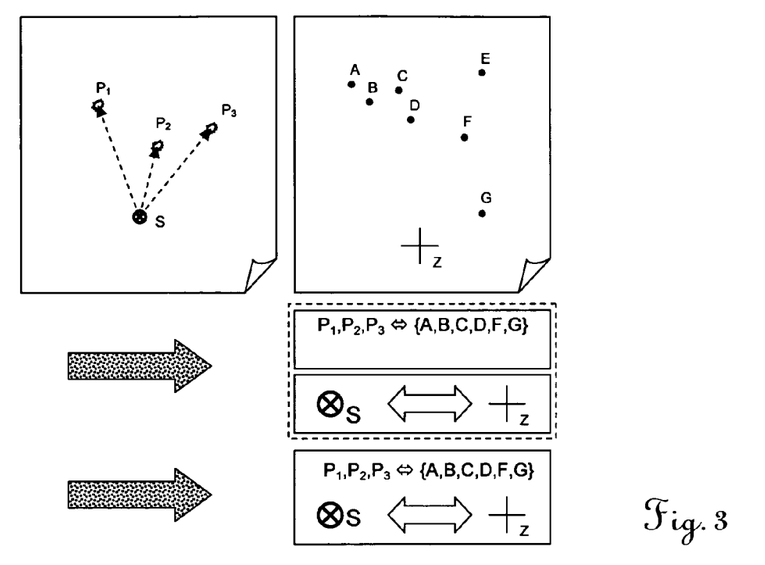
FIG. 3 shows two basic concepts of the position determination method according to the invention.

The position determination method according to the invention must now solve two subtasks the assignment of the reference points $P_1$ to $P_3$ to the corresponding datum points of the set of datum points {A, B, C, D, E, F, G} and the determination of the position of the stationing point S relative to the origin Z of the external reference system, i.e. the position determination of the location of the geodetic measuring device.

These two subtasks lead to the two basic concepts of the position determination method according to the invention which are shown in FIG. 3.

Firstly—as shown by means of the upper arrow—the two subtasks can be implemented separately and sequentially, i.e. an assignment of the corresponding reference and datum points is effected first, hence an identification of the common elements of the set of reference points and set of datum points. A determination of the position of the device is then effected, it also being possible to use known methods of the prior art, i.e. the identification and assignment of the common elements are effected before the determination of the position of the geodetic device.

Secondly, however—as indicated by the lower arrow—assignment and position determination can also be effected in one step according to the invention, i.e. the identification and assignment of the common elements and the determination of the position of the geodetic device are effected together.

Figure 4A:
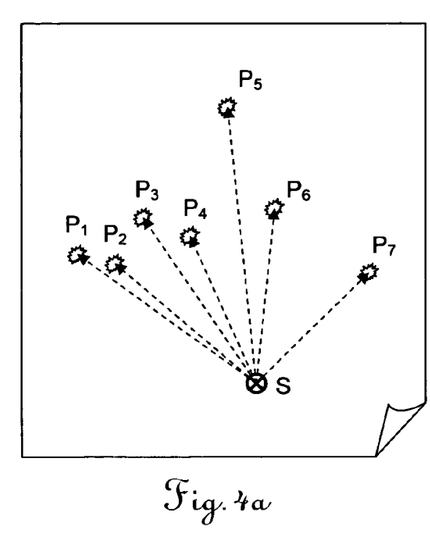
FIG. 4a-b show the schematic diagram of the principle of the position determination method according to the invention.
Figure 4B:
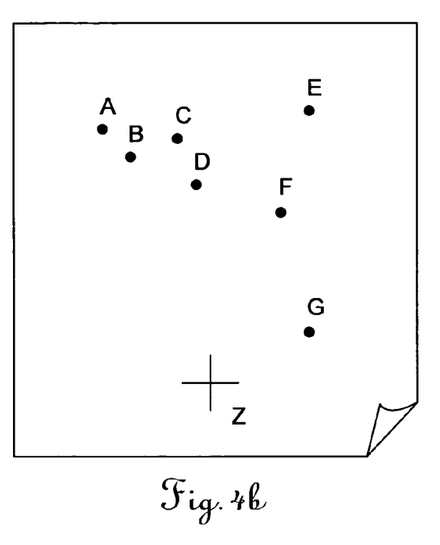

In FIG. 4a-b, the principle of the position determination method according to the invention is illustrated by an example which is shown graphically. As shown in FIG. 4a, a series of measurements from the stationing point S to reference points $P_1$-$P_7$ is carried out by the total station, which measurements correspond at least partly to measurable datum points of a set of datum points, without these reference points being known in their position in the external reference system or the assignment to datum points being known. These measurements are represented by the arrows from the stationing point S to the reference points $P_1$-$P_7$ shown schematically by the reflections. Here, only the direction, i.e. at least one angle, and the distance are recorded as reference quantities, i.e. in the device-related internal reference system, i.e. starting from the stationing point S. For the reference points $P_1$-$P_7$ of the set of reference points, only the relative position to the measuring device is thus determined from the reference quantities. Because the assignment of reference point to datum point is not absolutely essential in the determination of the reference quantities, automated detection and surveying of the reference points $P_1$-$P_7$ can also be effected without problems.

FIG. 4b illustrates the set of datum points comprising the datum points A-G, the position of the datum points being known in an external reference system relative to the origin Z thereof. In order to determine the actual position of the measuring device, i.e. its stationing point, in the external reference system, common elements of set of reference points and set of datum points are identified and assigned. These common elements permit the linking of positions of the datum points with the relative position of the reference points and hence a determination of the position of the geodetic device in the external reference system.

Figure 5:
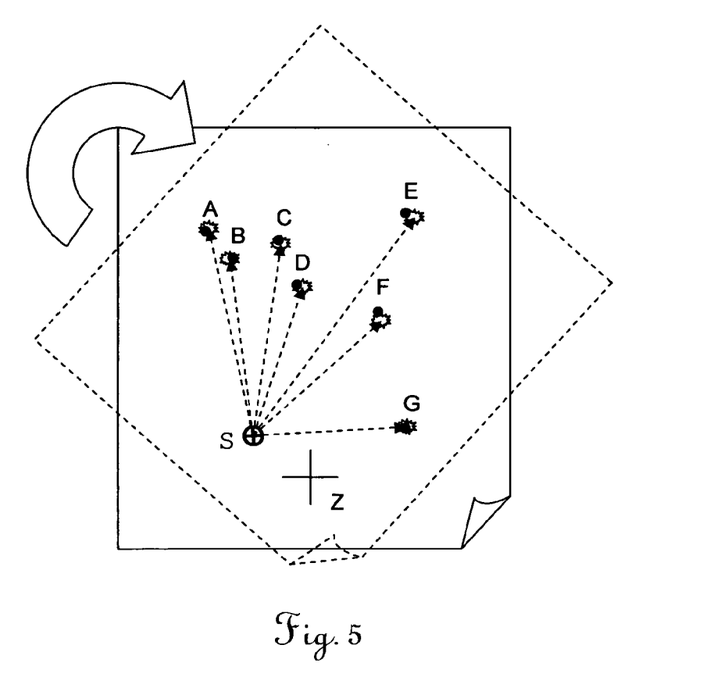
FIG. 5 shows a first working example of the position determination method according to the invention.
Figure 6:
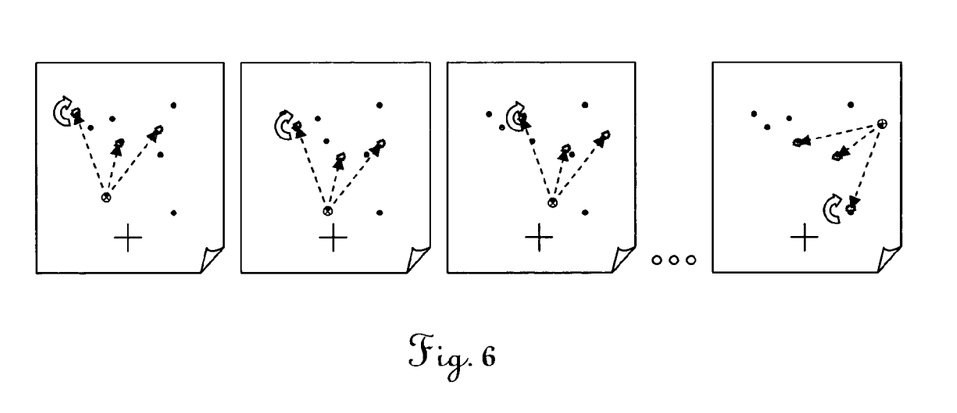
FIG. 6 shows a variant of the first working example of the position determination method according to the invention.

FIG. 5 illustrates the first working example of the position determination method according to the invention. In this example, the elements of the set of datum points and of the set of reference points correspond. From the set of reference points, a pattern representing the relative arrangement of the reference points is produced. In the same way, a pattern is derived from the set of datum points. The pattern of the reference points corresponds in this example to the diagram in FIG. 4a, and the pattern of the datum points to that of FIG. 4b. The two patterns are now displaced relative to one another and, if required, fitted in their scaling until a correspondence of the patterns is achieved within a certain tolerance range, so that the points are assigned. In the present example, points $P_1$ and A were assigned to one another and selected as a rotation point about which the pattern of the reference points was rotated relative to that of the datum points. After complete correspondence, the relative position of the device, i.e. of the stationing point S, in relation to the reference points can also be derived in the external reference system or transferred to said system and the position of the device can thus be determined. In addition to the datum point A chosen here purely by way of example, other reference points or datum points can also be chosen as rotation points.

The comparison and identification of common elements of set of reference points and set of datum points can be effected by mathematical rotation of a distribution of points in vectorial or coordinate representation. In addition to this approach, however, the described derivation of a pattern can also be effected as a graphical representation, for which various known and suitable methods are available for identification and assignment of reference points and datum points in image processing, for example by means of pattern comparison, such as, for example, template matching. Such methods also make it possible, in particular, to identify individual partial patterns within larger patterns, which is relevant, for example, if sets of datum points and of reference points differ in their cardinality.

Such a case with differing sets of datum points and of reference points can be solved by the approach shown in FIG. 5 as a variant of the first working example of the position determination method according to the invention. In this case, the set of datum points is greater than the reference points, which corresponds to a typical situation in which it is possible to see or to measure to only a part of the set of measuring points present altogether. Measurements can be carried out only to this part, so that the set of reference points represents a subset of the set of datum points. In addition to the problem of assignment of the reference points to the datum points, there is now the additional difficulty that the correct subset must be selected from the set of datum points. In the example shown, the set of datum points of FIG. 4b was once again relied upon but the measurement is effected from another stationing point and to only three datum points. The corresponding reference points are represented by the three arrows in their position relative to the measuring device.

As shown in the partial figures, the pattern of the three reference points is rotated successively in each case about one of the datum points and the position of maximum agreement in each case is determined for each point, the datum points being passed through from left to right in the example. After passing through all datum points, an appropriate comparison is then carried out between the respective best positions of the datum points. In this specific example, the partial figure on the extreme right shows substantial agreement at a certain position, so that the assignment of the points and the determination of the position of the measuring device can be effected therefrom simultaneously.

Although a two-dimensional representation was always chosen in the figures, it is also possible in principle to produce a three-dimensional pattern and handle it in a corresponding manner. Owing to the actual arrangement of the datum points, however, a two-dimensional representation and use of the horizontal angles frequently arises in practice.

The representation as a pattern has the advantage that not only the distances to the measuring device but also the angles and hence the relative position of the reference points to one another can be evaluated in a comparison process. On the other hand, however, the information content or the data volume of the quantities to be correlated can also be reduced, for example, by using only the distances of the reference points relative to one another.

Figure 7:
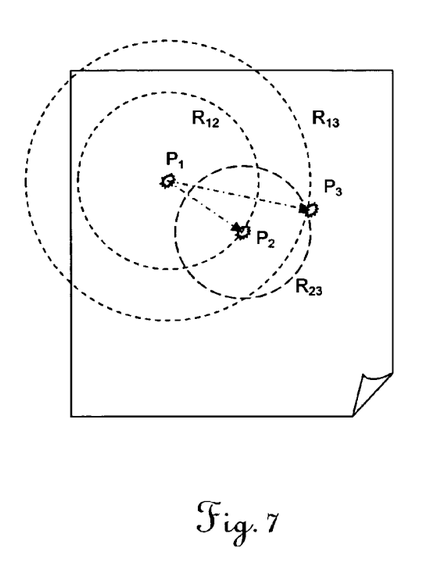
FIG. 7 shows a first variant of a second working example of the position determination method according to the invention.

Such a distance-based approach is shown in FIG. 7 as a second working example of a position determination method according to the invention. In contrast to the predominantly point-based approach of the first working example, the connection of points is considered here. The relative distances or radii $R_{12}$, $R_{13}$ and $R_{23}$, which are represented here by circles with the corresponding radius around the reference points, are derived here by way of example from the measured quantities of the reference points $P_1$ to $P_3$. For identifying common points, the radii $R_{12}$ and $R_{23}$ coordinated with the reference point $P_1$ are assigned successively to the various datum points and a check is carried out to determine whether it is possible to find other datum points having the corresponding radii $R_{12}$ and $R_{13}$. This procedure is shown in FIG. 7 in the right partial figures, in sequence from top to bottom, so that, on identification and assignment, comparison of the relative distances of the reference points with distances of the datum points is effected. In the lowermost partial figure, this agreement can be found for the extreme right point of the set of datum points, i.e. it is possible to identify two other datum points lying on circles with the respective radii $R_{12}$ and $R_{13}$ to this first datum point. For checking, a check is carried out in the next step for the nearer of the two datum points to determine whether this is a distance away from the third datum point which corresponds to the radius $R_{23}$, which is the case in this example.

In this method, for a starting reference point, possible datum points corresponding to said reference point are therefore identified on the basis of the radii or distances coordinated with the starting reference point, a corresponding threshold value or a permissible deviation being set for determining an agreement. The set of possible datum point candidates is then further limited on the basis of further radii or distances between the other reference points until ideally only a single assignment remains. The solution space of possible assignment, i.e. identifications of common elements, is thus limited on the basis of the progressive consideration of relative positions and distances of reference points to one another. In the case of a lack of correspondence, i.e. an empty solution set, or a plurality of possible correspondences, i.e. ambiguity of the solution, for example, the threshold value can be changed so that the acceptance behaviour changes.

This first variant of the second working example of the position determination method according to the invention therefore utilizes only the radius or the non directional distance between the reference points. The relative position thereof to one another follows from the intersections of the radii.

Figure 8A:
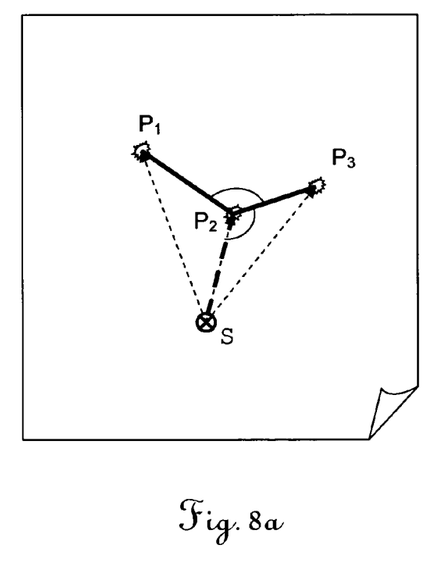
FIG. 8a-b show a second variant of the second working example of the position determination method according to the invention.
Figure 8B:
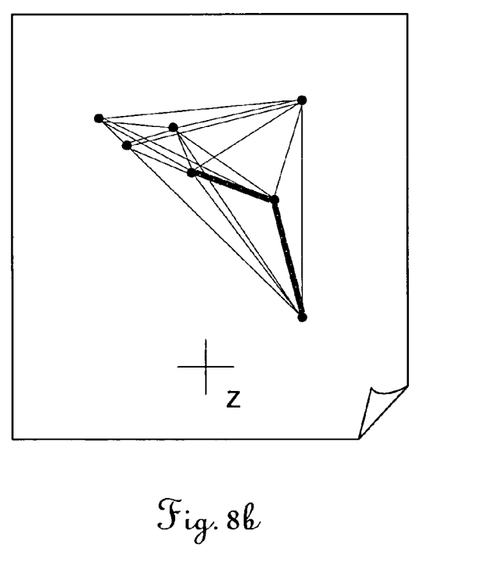

FIG. 8a-b show a second variant of the second working example of the position determination method according to the invention, in which no longer are only individual distances or radii of the reference points compared with those of the datum points but a plurality of distances geometrically related to one another are utilized and compared so that the identification and assignment can also be affected by means of graphical optimization methods.

As shown in FIG. 8a, distances are derived as connecting lines between the points from the relative position of the reference points $P_1$ to $P_3$ and are represented as edges of a graph whose nodes are formed by the reference points $P_1$ to $P_3$. This example uses only two edges which connect all three reference points $P_1$ to $P_3$. Thus, the relative position of the reference points $P_1$ to $P_3$ is represented by a reference point graph with the reference points $P_1$ to $P_3$ as nodes and relative distances of the reference points $P_1$ to $P_3$ as edges. The graph can be produced as a complete reference point graph which contains all relative distances of the reference points $P_1$ to $P_3$ to one another or with a reduced number of connections, i.e. edges.

The connection to the stationing point S can be included in the graph by one or more edges, as shown by dashed lines in FIG. 8a, but these edges are not used for comparison with the datum points or suppressed or tolerated.

As shown in this example, it is possible to derive a framework or minimum framework of the graph, in which all reference points $P_1$ to $P_3$ are connected by only a few characteristic edges. For producing graphs and for deriving frameworks or spanning trees or minimum frameworks or minimum spanning trees, corresponding algorithms are available in graphical optimization. Thus, after the production of a graph with all possible connections, i.e. edges, between all reference points, edges can be removed again in order to derive a minimum spanning tree. Various approaches are suitable for this purpose, it being possible to use in particular greedy approaches which select in each case the best solution locally, for example on the basis of the transit time behaviour. Examples of these are the algorithms of Prim or Kruskal. The requirement of minimality is, however, not absolutely essential. For rapid identifiability, it may be advantageous in certain circumstances to assemble a spanning tree from edges which are as characteristic as possible and therefore easily identifiable, for example from the longest and shortest of the edges of the graph which are present.

In basically the same manner, the datum points are also transferred to a graph, the relative position of the datum points being represented by a datum point graph with datum points as nodes and relative distances of the datum points as edges. However, this should, as shown in FIG. 8b, be in particular a complete datum point graph which contains all relative distances of the datum points to one another, since the reference point graph is to be identified in this connection network.

In the simplest form, only a single edge, for example the longest edge, is used as a first edge in a first step for the reference point set, the position of which edge is identified in the datum point graph. For this purpose, for example, all edges of the datum point graph are listed in a table on the basis of their length, so that a rapid comparison is possible. Subsequently, the second longest edge or the respective longest edge adjacent to the first edge is identified in the datum point graph. On identification of corresponding edges or trees, the edges are therefore compared in the sequence of their length.

As shown in FIGS. 8a and 8b, however, frameworks or trees can also be identified in datum point graphs, for which purpose search methods are known in the prior art and image processing methods can also be used. The advantage here is that the arrangement of the edges relative to one another, i.e. the relative position of the connecting lines between the reference points, is also used for identification. In FIG. 8b, the reference point graph identified in the datum point graph and fitted therewith is represented by thick lines. By using a graph and identification thereof in another graph, the common points as well as the orientation relative to one another are simultaneously determined, so that the stationing point can be derived on the basis of the connecting edges directly in its position relative to the origin Z of the external reference system, which however, for reasons of clarity, is not shown in FIG. 8b.

In the second variant of the second working example of the position determination method according to the invention, during identification and assignment, an identification of corresponding edges or trees of reference point and datum point graphs is therefore carried out and simultaneously derives the common points and the position of the stationing point S or of the geodetic measuring device.

After the corresponding identification of the reference point graph in the datum point graph, the stationing point S can be set on the basis of the connecting edges shown by dashed lines in FIG. 8a, in relation to the origin Z, and hence the position of the measuring device can be determined.

Figure 9A:
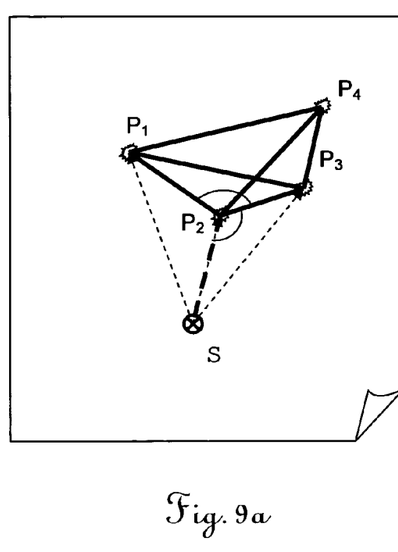
FIG. 9a-b show a third variant with treatment of incorrect measurements for the second working example of the position determination method according to the invention.
Figure 9B:
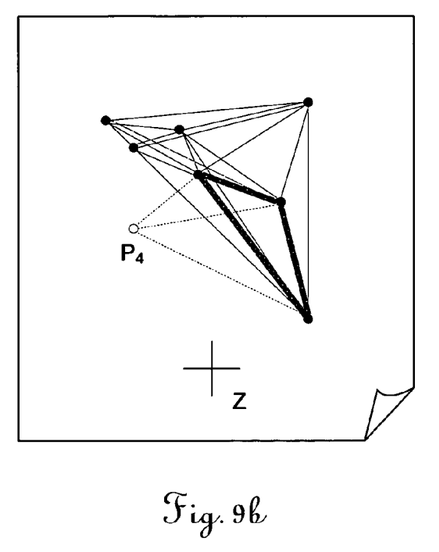

The use of a complete graph with all edges is illustrated in FIG. 9a-b as a third variant with an exemplary treatment of erroneous measurements for the second working example of the position determination method according to the invention.

As shown in FIG. 9a, altogether four reference points $P_1$ to $P_4$ are surveyed, for which all possible connections are derived as edges and are adopted for creating the graph, it once again being possible to integrate the stationing point S as a further node in the graph. However, as in FIG. 8a-b, in comparison with the datum point graph, this is not considered.

The reference point graph now has a relatively large number of edges to be identified in the datum point graph, so that the assignment process becomes more complex. On the other hand, however, more edges are available than, for example, in the case of a minimum framework. This also permits, for example, the identification of erroneous measurements, i.e. of nodes which have no corresponding element in the datum point set. In this example, the reference point $P_4$ is based on an erroneous measurement, so that no corresponding datum point can be assigned. On the basis of the agreement of the other edges and the complete lack of the edges contacting the point $P_4$ in the datum point graph, it is however possible to assess that $P_4$ is an erroneous measurement, so that this point is not taken into account or is removed from the reference point graph. The use of a larger number of edges therefore permits improved identification of non-common points and hence of erroneous or faulty measurements.

Of course, these figures shown schematically represent only possible working examples. The various approaches can, according to the invention, be combined with one another and with methods of the prior art from image processing and graphical optimization. Moreover, after determination of the common points is complete, i.e. assignment of reference points to datum points, methods to date for calculating the stationing point can be used.

I claim:

1. A position determination method for a theodolite or a total station having distance and angle measuring functionality comprising a datum point set of datum points which measurements are capable of being made and the positions of which are known and define a distribution of datum points in an external reference system, the method comprising:
   determining the relative position of the theodolite or total station device and reference points of a reference point set by measurements of in each case distance and at least one angle from the theodolite or total station device to the reference points as reference quantities, the reference quantities being determined in a device-related reference system and representing a distribution of reference points in an internal reference system, and reference point set and datum point set having common elements;

determining the position of the theodolite or total station device in the external reference system from the reference points;

deriving the relative position of the reference points to one another from the reference quantities; and identifying and assigning the common elements on the basis of identifying common points of the distribution of the datum points and the distribution of the reference points by comparing the relative position of the datum points of the datum point set with the relative position of the reference points of the reference point set.

2. A position determination method according to claim 1, wherein the identification and assignment of the common elements are performed before the determination of the position of the theodolite or total station device.

3. A position determination method according to claim 1, wherein the identification and assignment of the common elements and the determination of the position of the theodolite or total station device are performed together.

4. A position determination method according to claim 1, further comprising determining the relative distances of the reference points to one another.

5. A position determination method according to claim 4, further comprising performing a comparison of the relative distances of the reference points for distances of the datum points during the identification and assignment.

6. A position determination method according to claim 1, further comprising producing a pattern representing the relative arrangement of the reference points.

7. A position determination method according to claim 6, wherein the identification and assignment is carried out by means of image processing.

8. A position determination method according to claim 6, wherein the identification and assignment is carried out by means of image processing including pattern comparison.

9. A position determination method according to claim 6, wherein the identification and assignment is carried out by means of image processing including template matching.

10. A position determination method according to claim 6, wherein, during the identification and assignment, the pattern is rotated about datum points.

11. A position determination method according to claim 1, wherein the identification and assignment include graphical optimization.

12. A position determination method according to claim 11, wherein the relative position of the reference points is represented by a reference point graph with reference points as nodes and relative distances of the reference points as edges.

13. A position determination method according to claim 11, wherein the relative position of the reference points is represented by a reference point graph with reference points as nodes and relative distances of the reference points as edges as a complete reference point graph which contains all relative distances of the reference points to one another.

14. A position determination method according to claims 12, further comprising an identification of corresponding edges or trees of reference point and datum point graphs during the identification and assignment.

15. A position determination method according to claims 12, further comprising an identification of corresponding edges or trees of reference point and datum point graphs by search methods during the identification and assignment.

16. A position determination method according to claim 14, wherein, during the identification of corresponding edges or trees, edges are compared in the sequence of their length.

17. A position determination method according to any of claims 12, further comprising deriving a framework or minimum framework of the graph.

18. A position determination method according to claim 1, further comprising automatically determining and surveying the reference points.

19. A storage device with program code configured to cause a computer to carry out the method according to claim 1.

* * * * *

UNITED STATES PATENT AND TRADEMARK OFFICE
CERTIFICATE OF CORRECTION

PATENT NO. : 8,483,512 B2  Page 1 of 1
APPLICATION NO. : 12/598458
DATED : July 9, 2013
INVENTOR(S) : Bernd Moeller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this
Eighth Day of September, 2015

Michelle K. Lee
*Director of the United States Patent and Trademark Office*